UNITED STATES PATENT OFFICE.

EDWARD CONWAY, OF DAYTON, OHIO.

IMPROVED LINIMENT.

Specification forming part of Letters Patent No. 37,901, dated March 17, 1863.

*To all whom it may concern:*

Be it known that I, EDWARD CONWAY, of Dayton, Montgomery county, Ohio, have invented a new and useful liniment, called "Dr. E. Conway's Linimentum," for the stopping of blood, the cure of rheumatism, cuts, and inflammation of every kind; and I declare that the following is a full description of the same.

The nature of my invention consists in distilling, by any usual method, an amber-colored transparent liniment from the following described ingredients, used in the following proportions, by measure, and of the following strength, to wit: one part tincture of camphor, full strength; one part distilled hartshorn or ammonia, full strength; one part tincture of opium, full strength; one part extract of orris-root, full strength, procured by distillation with spirits; one-half part extract of white-oak bark, procured by distillation with spirits; one-half part extract cedar bark, procured by distillation with spirits, the two last of full strength; one-half part fourth-proof brandy, and one-half part whisky, 35° above proof whisky. These ingredients, being all prepared separately, are mixed together, and from them is distilled, by any usual method, the liniment above described.

What I claim as my invention, and desire to secure by Letters Patent, is—

The production by distillation from the above-described ingredients, in the above-described amounts and strength, the above-described liniment for the stopping of blood, the cure of rheumatism, cuts, and inflammation of all kinds.

EDWARD CONWAY.

Witnesses:
 JOHN HOWARD,
 CHAS. PARROTT.